(12) United States Patent
Furuta

(10) Patent No.: US 10,523,883 B2
(45) Date of Patent: Dec. 31, 2019

(54) INFRARED IMAGING DEVICE AND METHOD OF UPDATING FIXED PATTERN NOISE DATA

(71) Applicant: FUJIFILM Corporation, Tokyo (JP)

(72) Inventor: Yoshinori Furuta, Saitama (JP)

(73) Assignee: FUJIFILM Corporation, Tokyo (JP)

(*) Notice: Subject to any disclaimer, the term of this patent is extended or adjusted under 35 U.S.C. 154(b) by 56 days.

(21) Appl. No.: 15/814,615

(22) Filed: Nov. 16, 2017

(65) Prior Publication Data

US 2018/0098011 A1 Apr. 5, 2018

Related U.S. Application Data

(63) Continuation of application No. PCT/JP2016/002400, filed on May 17, 2016.

(30) Foreign Application Priority Data

May 21, 2015 (JP) ................................. 2015-103566

(51) Int. Cl.
  *H04N 5/365* (2011.01)
  *G01J 1/04* (2006.01)
  (Continued)

(52) U.S. Cl.
  CPC .......... *H04N 5/3656* (2013.01); *G01J 1/0411* (2013.01); *G01J 1/44* (2013.01); *H04N 5/33* (2013.01); *G01J 2001/444* (2013.01)

(58) Field of Classification Search
  CPC ........ H04N 5/365; H04N 5/33; H04N 5/3651; G01J 1/42
  See application file for complete search history.

(56) References Cited

U.S. PATENT DOCUMENTS 5,903,659 A 5/1999 Kilgore
6,768,513 B1 7/2004 Watanabe et al.
(Continued)

FOREIGN PATENT DOCUMENTS

EP 0647064 A1 4/1995
JP 56-89033 A 7/1981
(Continued)

OTHER PUBLICATIONS

International Preliminary Report on Patentability and Written Opinion of the International Searching Authority (forms PCT/IB/373, PCT/ISA/237 and PCT/IB/326), dated Nov. 30, 2017, for International Application No. PCT/JP2016/002400, with an English translation of the Written Opinion.
(Continued)

*Primary Examiner* — Anand S Rao
*Assistant Examiner* — Tyler B Edwards
(74) *Attorney, Agent, or Firm* — Birch, Stewart, Kolasch & Birch, LLP

(57) ABSTRACT

A noise data update processing unit calculates the amount of a fixed pattern noise component on the basis of a detection signal of infrared rays detected by an infrared detector in a state where an optical system is controlled to be in a non-focused state, and updates an FPN data storage unit with the calculated amount of the FPN component. The noise data update processing unit calculates an average value of detection signals of each detector element and a plurality of peripheral detector elements, and calculates a signal component dependent on incident infrared rays included in the detection signal of each detector element by subtracting an average value of fixed pattern noise data before update from the calculated average value. The amount of the fixed pattern noise component is calculated by subtracting the calculated (Continued)

signal component from the detection signal of each detector element.

10 Claims, 9 Drawing Sheets

(51) Int. Cl.
*G01J 1/44* (2006.01)
*H04N 5/33* (2006.01)

(56) References Cited

U.S. PATENT DOCUMENTS

| | | | |
|---|---|---|---|
| 2012/0091340 A1* | 4/2012 | Young | H04N 5/33 250/332 |
| 2014/0016879 A1* | 1/2014 | Hogasten | H04N 5/33 382/264 |
| 2014/0037225 A1* | 2/2014 | Hogasten | G06T 5/50 382/260 |

FOREIGN PATENT DOCUMENTS

| | | | |
|---|---|---|---|
| JP | 7-222059 | A | 8/1995 |
| JP | 8-223484 | A | 8/1996 |
| JP | 10-23335 | A | 1/1998 |
| JP | 10-142065 | A | 5/1998 |
| JP | 2000-125206 | A | 4/2000 |
| JP | 2001-111893 | A | 4/2001 |
| JP | 2001-509996 | A | 7/2001 |
| JP | 2001-336983 | A | 12/2001 |
| JP | 2010-200236 | A | 9/2010 |

OTHER PUBLICATIONS

International Search Report (form PCT/ISA/210), dated Oct. 4, 2016, for International Application No. PCT/JP2016/002400, with an English translation.

Chinese Office Action and Search Report, dated Mar. 27, 2019, for Chinese Application No. 201680028646.8, with English translation of the Chinese Office Action.

* cited by examiner

FIG. 4

| (x-2,y-2) | (x-1,y-2) | (x,y-2) | (x+1,y-2) | (x+2,y-2) |
|---|---|---|---|---|
| (x-2,y-1) | (x-1,y-1) | (x,y-1) | (x+1,y-1) | (x+2,y-1) |
| (x-2,y) | (x-1,y) | (x,y) | (x+1,y) | (x+2,y) |
| (x-2,y+1) | (x-1,y+1) | (x,y+1) | (x+1,y+1) | (x+2,y+1) |
| (x-2,y+2) | (x-1,y+2) | (x,y+2) | (x+1,y+2) | (x+2,y+2) |

FIG. 5

| 1 | 1 | 1 | 1 | 1 |
|---|---|---|---|---|
| 1 | 2 | 2 | 2 | 1 |
| 1 | 2 | 3 | 2 | 1 |
| 1 | 2 | 2 | 2 | 1 |
| 1 | 1 | 1 | 1 | 1 |

FIG. 11

| R1 | R2 | R3 | R4 |
|----|----|----|----|
| R5 | R6 | R7 | R8 |
| R9 | R10 | R11 | R12 |
| R13 | R14 | R15 | R16 |

INFRARED IMAGING DEVICE AND METHOD OF UPDATING FIXED PATTERN NOISE DATA

CROSS REFERENCE TO RELATED APPLICATIONS

The present application is a Continuation of PCT International Application No. PCT/JP2016/002400 filed on May 17, 2016, which claims priority under 35 U.S.C. § 119(a) to Japanese Patent Application No. 2015-103566 filed on May 21, 2015. Each of the above applications is hereby expressly incorporated by reference, in its entirety, into the present application.

BACKGROUND

Technical Field

The present invention relates to an infrared imaging device, and more specifically relates to an infrared imaging device including an infrared detector that detects incident infrared rays and converts the detected incident infrared rays into an electrical signal. In addition, the present invention relates to a method of updating fixed pattern noise data in such an infrared imaging device.

Background Art

Infrared imaging devices that detect incident infrared light (infrared rays) and generate an infrared image have been known. Generally, the infrared imaging devices include an infrared detector that detects infrared rays radiated from a subject and converts the detected infrared rays into an electrical signal. The infrared imaging devices are used in a wide range of fields such as a monitoring camera, a night vision device, thermography, and a front monitoring device mounted in a vehicle, an airplane or the like.

The infrared imaging device generates fixed pattern noise specific to the device such as a variation in the sensitivity of the infrared detector, or variations in the gain and offset of a circuit. Particularly, in the infrared imaging device using a focal plane array arranged two-dimensionally as infrared detector elements, each detector element within the array has a fluctuation in characteristics. Therefore, as a result, fixed pattern noise changing for a relatively long time is generated.

The generation of the fixed pattern noise causes the occurrence of a fluctuation in a pixel value and leads to a uniform image not being obtained even in a case where an image of a surface having uniform temperature is captured by the infrared imaging device. In order to reduce the influence of the fixed pattern noise, data of the fixed pattern noise (fixed pattern noise data) may be acquired, and the fixed pattern noise data may be subtracted from an image signal obtained by capturing an image of a subject. The fixed pattern noise data is acquired, for example, in a state where a light source having a uniform amount of light is installed at the front of the infrared detector and infrared rays incident on the infrared detector are cut off from the outside.

Since the fixed pattern noise fluctuates depending on a change in the environment such as temperature, there is a demand for the fixed pattern noise data to be repeatedly acquired in the course of imaging. In order to meet such a demand, a technique is proposed in which a shutter mechanism is provided within an infrared imaging device, and infrared rays incident on an infrared detector are cut off from the outside to acquire fixed pattern noise data (see, for example, JP1998-142065A (JP-H10-142065A)). However, in JP1998-142065A (JP-H10-142065A), the shutter mechanism unnecessary for original imaging is required to be disposed in the periphery of an optical system and the infrared detector, which leads to an increase in cost or an increase in the size of a device. In addition, there is also a disadvantage of an increase in the number of failure occurrence points.

JP2001-336983A discloses an infrared imaging device capable of acquiring fixed pattern noise data while a shutter mechanism is not required. The infrared imaging device disclosed in JP2001-336983A includes an optical system that condenses light radiated from a target object (subject) to cause the condensed light to be incident on an infrared detector, and a subtractor that outputs image data obtained by subtracting fixed pattern noise data from an image signal (image data) which is output by the infrared detector. The optical system is positioned at a focusing location by a focus adjustment mechanism during a normal imaging.

In JP2001-336983A, the optical system is controlled to be in a non-focused state during the acquisition of the fixed pattern noise data. The optical system is set to be in a non-focused state, light from all directions within an observation field view of the optical system is uniformly incident on the infrared detector. That is, a flux of light incident on the optical system from various directions is not imaged at a specific point of the infrared detector, and is uniformly incident on the detection surface of the infrared detector. In this state, an error between output image data of the subtractor and expected value data of the fixed pattern noise is obtained. A negative feedback given to the subtractor is performed using return data based on this error as the fixed pattern noise data, and the return data when the output image data of the subtractor and the expected value data are set to be substantially the same as each other is held as the fixed pattern noise data.

In JP2001-336983A, image data obtained in a state where a light source having a uniform amount of light is installed at the front of the infrared detector and infrared rays incident on the infrared detector are cut off from the outside is used as the expected value data of the fixed pattern noise. The optical system is set to be in a non-focused state, and light from all directions within an observation field view is caused to be incident on the detection surface of the infrared detector. Thereby, it is possible to cause infrared rays having a uniform amount to be incident on each detector element, and to obtain the fixed pattern noise data without using the shutter mechanism.

SUMMARY OF THE INVENTION

In the infrared imaging device disclosed in JP2001-336983A, light from all directions within the observation field view of the optical system is required to be uniformly incident on the detection surface of the infrared detector in order to appropriately acquire the fixed pattern noise data. However, in an actual usage environment, the light from all directions within the observation field view is not necessarily capable of being incident on the detection surface of the infrared detector. Even in a case where the optical system is set to be in a non-focused state, a pattern occurs in an infrared image. In other words, portions having much incident infrared rays and portions having little incident infrared rays are distributed within the image. In the infrared imaging device disclosed in JP2001-336983A, in a case where there is a difference between the amount of infrared rays incident on a certain region of the detection surface of the infrared detector and the amount of infrared rays incident on another region, it is not possible to obtain appropriate fixed pattern noise data.

The present invention is contrived in view of such circumstances, and an object thereof is to provide an infrared imaging device capable of acquiring fixed pattern noise data even in a case where a shutter mechanism is not required, and light from all directions within an observation field view is not uniformly incident on the detection surface of an infrared detector.

In addition, another object of the present invention is to provide a method of updating fixed pattern noise data in such an infrared imaging device.

In order to achieve the above objects, according to the present invention, there is provided an infrared imaging device comprising: an optical system which is capable of controlling an imaging position; an infrared detector, including a plurality of detector elements that detect incident infrared rays, in which infrared rays are incident on an infrared detection surface through the optical system; a noise correction processing unit that subtracts fixed pattern noise data from a detection signal of the infrared rays detected by the plurality of detector elements, to thereby remove fixed pattern noise from the infrared detection signal; a focus control unit that controls the imaging position of the optical system; and a noise data update processing unit that calculates an amount of a fixed pattern noise component on the basis of the detection signal of the infrared rays detected by the plurality of detector elements in a state where the optical system is set to be in a non-focused state by the focus control unit controlling the imaging position of the optical system, and updates the fixed pattern noise data with the calculated amount of a fixed pattern noise component, wherein the noise data update processing unit calculates, for each detector element which is a target detector element for calculating the amount of a fixed pattern noise component, an average value of detection signals of the target detector element and a plurality of peripheral detector elements, calculates a signal component dependent on incident infrared rays included in the detection signal of the target detector element by subtracting an average value of fixed pattern noise data before update from the calculated average value, and calculates the amount of a fixed pattern noise component by subtracting the calculated signal component from the detection signal of the target detector element.

In the infrared imaging device of the present invention, it is preferable that the noise data update processing unit calculates a difference between the calculated amount of a fixed pattern noise component and the fixed pattern noise data before update with respect to each detector element, and updates the fixed pattern noise data with the calculated amount of a fixed pattern noise component with respect to a detector element in which the difference is equal to or less than a first threshold value. In addition, it is preferable that the noise data update processing unit does not update the fixed pattern noise data with respect to a detector element in which the difference is larger than the first threshold value.

When a percentage of the number of detector elements in which the difference in a certain region is larger than the first threshold value is higher than a second threshold value, the noise data update processing unit may not update the fixed pattern noise data with respect to detector elements included in the region.

It is preferable that the noise data update processing unit adds detection signals of a detector element of interest and detector elements present in a periphery of the detector element of interest, and calculates the average value.

The average value of the detection signals may be a weighted average value obtained by weighting and adding detection signals of a detector element of interest and detector elements present in a periphery of the detector element of interest, and calculating a weighted average. In that case, it is preferable that weighting multiplied to each detector element in weighting addition is set in accordance with a distance between each of the peripheral detector elements and the detector element of interest. It is preferable that the weighting is set to be large as the distance between each of the peripheral detector elements and the detector element of interest becomes shorter.

The infrared imaging device of the present invention may further comprise a temperature measurement unit that measures an ambient temperature. In that case, the noise data update processing unit may update the fixed pattern noise data in a case where a difference between an ambient temperature measured by the temperature measurement unit and an ambient temperature during previous update of the fixed pattern noise data is equal to or larger than a temperature difference threshold value.

The noise data update processing unit may update the fixed pattern noise data periodically repeatedly.

In addition, according to the present invention, there is provided a method of updating fixed pattern noise data indicating fixed pattern noise in an infrared detector including a plurality of detector elements, the method comprising: a step of controlling an optical system which is capable of controlling an imaging position, and setting infrared rays incident on the infrared detector to be in a non-focused state; a step of calculating an amount of a fixed pattern noise component on the basis of a detection signal of the infrared rays detected by the plurality of detector elements in a state of being controlled to be in the non-focused state; and a step of updating the fixed pattern noise data with the calculated amount of a fixed pattern noise component, wherein the step of calculating the amount of a fixed pattern noise component includes calculating, for each detector element which is a target detector element for calculation, an average value of detection signals of the target detector element and a plurality of peripheral detector elements, calculating a signal component dependent on incident infrared rays included in the detection signal of the target detector element by subtracting an average value of fixed pattern noise data before update from the calculated average value, and calculating the amount of a fixed pattern noise component by subtracting the calculated signal component from the detection signal of the target detector element.

In the infrared imaging device and the method of updating fixed pattern noise data according to the present invention, infrared rays are caused to be incident on the infrared detector in a state where the optical system is controlled to be in a non-focused state, an average value of detection signals of each detector element to be processed and a plurality of peripheral detector elements is calculated, and a signal component dependent on incident infrared rays included in the detection signal of each detector element is calculated by subtracting an average value of fixed pattern noise data before update the calculated average value. The amount of a fixed pattern noise component is calculated by subtracting the calculated signal component from the detection signal of each detector element. In this manner, it is possible to acquire data of fixed pattern noise even in a case where a shutter mechanism is not required, and light from all directions within an observation field view is not uniformly incident on the detection surface of the infrared detector.

BRIEF DESCRIPTION OF THE DRAWINGS

FIG. 4 is a diagram illustrating an example of a range of peripheral detector elements.

FIG. 5 is a diagram illustrating an example of weighting used in a case where a weighted average value is calculated.

FIG. 11 is a diagram illustrating a division example of a region of an image.

DESCRIPTION OF EMBODIMENTS

Figure 1:
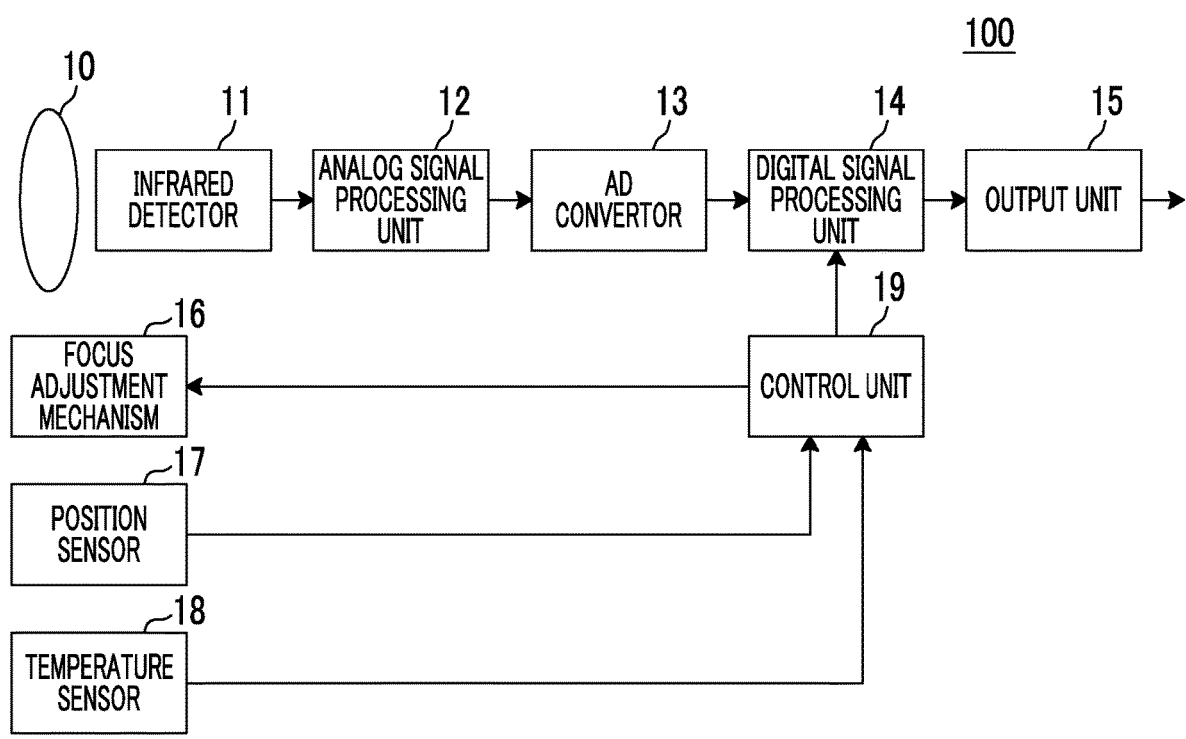
FIG. 1 is a block diagram illustrating an infrared imaging device according to a first embodiment of the present invention.

Hereinafter, embodiments of the present invention will be described in detail with reference to the accompanying drawings. FIG. 1 shows an infrared imaging device according to a first embodiment of the present invention. An infrared imaging device 100 includes an optical system 10, an infrared detector 11, an analog signal processing unit 12, an analog to digital (AD) convertor 13, a digital signal processing unit 14, an output unit 15, a focus adjustment mechanism 16, a position sensor 17, a temperature sensor 18, and a control unit 19. The infrared imaging device 100 may be one completed product, and may be a module used in a state of being incorporated into another product.

The optical system 10 is an imaging optical system including one or more lenses. The optical system 10 can control the position (imaging position) of an imaging surface. The infrared detector 11 is an infrared imaging element (infrared sensor), and captures an optical image formed by the optical system 10 to convert the captured image into an electrical signal. The infrared detector 11 includes a plurality of detector elements that detects incident infrared light (infrared rays). In the infrared detector 11, the plurality of detector elements are arranged, for example, two-dimensionally. Infrared rays are incident on the infrared detection surface (hereinafter, also called the detection surface simply) of the infrared detector 11 through the optical system 10. An infrared image is formed on the basis of a detection signal of each detector element of the infrared detector 11.

The infrared detector 11 detects infrared rays of a range having, for example, a wavelength of 0.83 μm to 1,000 μm. It is preferable that the infrared detector 11 detects far-infrared rays of a range having, particularly, a wavelength of 6 μm to 1,000 μm. A thermal type infrared sensor such as a micro-bolometer or silicon on insulator (SOI) diode type can be used in the infrared detector 11.

The analog signal processing unit 12 performs analog electrical processing on an infrared detection signal which is output by the infrared detector 11. The analog signal processing unit 12 typically includes an amplifier that amplifies the infrared detection signal. The AD convertor 13 samples the infrared detection signal, and converts the sampled infrared detection signal into digital data (digital signal value). The digital signal processing unit 14 performs signal processing on the infrared detection signal converted into digital data by the AD convertor 13. The signal processing in the digital signal processing unit 14 includes a process of correcting fixed pattern noise (hereinafter, also called fixed pattern noise (FPN)) of the infrared detection signal and a process of updating FPN data used in the correction process.

The control unit 19 controls the entire device. A programmable logic device (PLD) such as, for example, a field-programmable gate array (FPGA) can be used in the control unit 19. The control unit 19 switches the operating mode of the infrared imaging device 100 between a normal imaging mode and an update mode of FPN data. The control unit 19 controls signal processing in the digital signal processing unit 14 in accordance with the operating mode through a control signal. Specifically, the digital signal processing unit 14 is caused to perform the FPN correction process during the normal imaging mode, and is caused to perform the FPN data update process during the update mode of FPN data.

The temperature sensor (temperature measurement unit) 18 measures, for example, the temperatures in and around the infrared detector 11. The control unit 19 may switch the operating mode to the update mode of FPN data on the basis of a change in the temperature measured by the temperature sensor 18. For example, in a case where a difference between the temperature measured by the temperature sensor 18 and the temperature during the previous FPN data update is equal to or larger than a threshold value (temperature threshold value), the update of FPN data may be performed by switching the operating mode to the update mode of FPN. In addition, the control unit 19 may periodically repeatedly switch the operating mode to the update mode of FPN data during the normal imaging mode. In that case, the operating mode may be switched to the update mode of FPN data after a certain period of time has elapsed from the previous update time of FPN data. The update period of FPN data is not required to be constant.

The focus adjustment mechanism 16 adjusts a relative positional relationship between the optical system 10 and the infrared detector 11. Hereinafter, a description will be given in which the relative positional relationship between the optical system 10 and the infrared detector 11 is adjusted by changing the position of the optical system 10. The focus adjustment mechanism 16 includes, for example, a motor that changes the position of a lens included in the optical system 10 and a drive circuit that drives the motor. The position sensor 17 detects the position of the lens included in the optical system 10. The position of the lens included in the optical system 10 is changed, and thus the imaging position of the optical system 10 is changed.

The control unit 19 also serves as a focus control unit that controls the imaging position of the optical system 10. The control unit 19 transmits a position signal for controlling the position of the optical system 10 to the focus adjustment mechanism 16. The focus adjustment mechanism 16 moves the optical system 10 to a position indicated by the received position signal. During the normal imaging mode, the control unit 19 controls the position of the optical system 10 to a position at which the imaging surface of the optical system 10 is coincident with the detection surface of the infrared detector 11, through the focus adjustment mechanism 16. During the normal imaging mode, the position of the optical system 10 may be changed following the motion of a subject, and may be fixed at a certain position.

During the update mode of FPN data, the control unit 19 controls the position of the optical system 10 to a position at which the imaging surface of the optical system 10 is not coincident with the detection surface of the infrared detector 11, through the focus adjustment mechanism 16. The control unit 19 controls the position of the optical system 10, for example, to a position at which the optical system 10 enters a focused state when a subject is closest to the optical system 10, or a position at which the optical system 10 enters a focused state when a subject is present in infinity.

Here, a state where the imaging surface of the optical system 10 is not coincident with the detection surface of the infrared detector 11 is called a non-focused state. That is, a state where an image based on the optical system 10 is not formed in the detector element of the infrared detector 11 is called a non-focused state. A state where images are not formed in the regions of all the detector elements is not necessarily required, and even a state where images are formed in some regions is assumed to a non-focused state as a whole. In addition, a state where the imaging surface of the optical system 10 is coincident with the detection surface of the infrared detector 11 is called a focused state. That is, a state where an image based on the optical system 10 is formed in the detector element of the infrared detector 11 is called a focused state. The imaging surface of the optical system 10 and the detection surface of the infrared detector 11 are not required to be entirely coincident with each other, and include a state where a subject is resolved on the detection surface of the infrared detector 11 to a recognizable degree.

The output unit 15 outputs an infrared detection signal (image data) on which signal processing is performed by the digital signal processing unit 14. The output unit 15 outputs, for example, the infrared detection signal onto a display device (not shown in FIG. 1) or the like, and displays an infrared image on a display screen. Alternatively, the infrared detection signal may be output to an external storage device (not shown in FIG. 1) such as a hard disk device or a memory card, and be stored in the external storage device. Further, the infrared detection signal may be transmitted to an external server or a processing device through a network, a communication cable or the like. The output unit 15 includes, for example, a digital analog (DA) convertor that converts a digital signal into an analog signal, and outputs the infrared detection signal as an analog signal. The output unit 15 may output the infrared detection signal as a digital signal.

Figure 2:
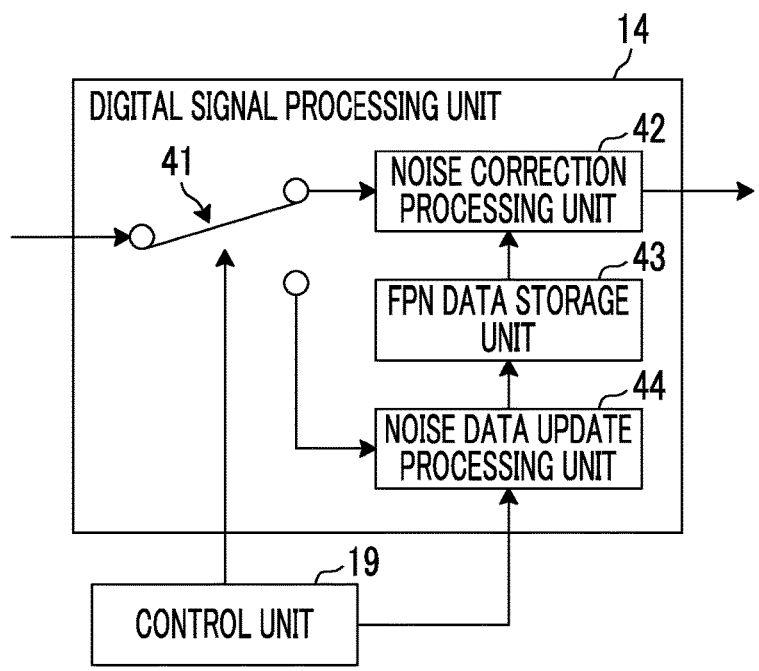
FIG. 2 is a block diagram illustrating a configuration of a digital signal processing unit.

FIG. 2 shows a configuration of the digital signal processing unit 14. The digital signal processing unit 14 includes a switch 41, a noise correction processing unit 42, an FPN data storage unit 43, and a noise data update processing unit 44. The digital signal processing unit 14 is typically configured as large scale integration (LSI) such as a digital signal processor (DSP). The DSP typically includes a processor, a read only memory (ROM) that stores a command for the processor, and a random access memory (RAM) that stores data, and these components are connected to each other through a bus. The processor operates in accordance with a command stored in the ROM, and thus the functions of the noise correction processing unit 42, the noise data update processing unit 44 and the like are realized. The DSP may have an interface for connection to an external storage device or the like.

Digital data of the infrared detection signal (hereinafter, the infrared detection signal converted into digital data is sometimes called the infrared detection signal without particular discrimination) which is output by the AD convertor 13 (see FIG. 1) is input to the switch 41. The switch 41 selectively outputs the infrared detection signal to the noise correction processing unit 42 and the noise data update processing unit 44. The changeover of the switch 41 is performed on the basis of, for example, a control signal which is output by the control unit 19. The control unit 19 outputs the infrared detection signal from the switch 41 to the noise correction processing unit 42 during the normal imaging mode. The control unit 19 outputs the infrared detection signal from the switch 41 to the noise data update processing unit 44 during the update mode of FPN data. In addition, the control unit instructs the noise data update processing unit 44 to update the FPN data.

The FPN data storage unit 43 stores the FPN data. Here, the term FPN indicates a noise component included in a detection signal of each detector element which is specific to each detector element (each pixel) of the infrared detector 11 (see FIG. 1). The FPN data is data indicating FPN of each detector element, and is a set of FPN of each detector element. The FPN data storage unit 43 may be configured such that a light source having a uniform amount of light may be installed at the front of the infrared detector 11 in an initial state, and that the infrared detection signal detected by the infrared detector 11 in a state where infrared rays incident on the infrared detector 11 from the outside are cut off is stored as the FPN data. The FPN data storage unit 43 may be configured, for example, inside the RAM included in the digital signal processing unit 14, and may be constituted by a rewritable non-volatile memory such as an electrically erasable and programmable read only memory (EEPROM).

The noise correction processing unit 42 refers to the FPN data storage unit 43 to correct (remove) an FPN component included in the infrared detection signal. More specifically, the FPN is removed from the infrared detection signal by subtracting the FPN data from the infrared detection signal. The noise correction processing unit 42 removes a noise component specific to each detector element by subtracting the FPN data of the detector element from the infrared detection signal which is output by each detector element included in the infrared detector 11, and outputs a signal component dependent on the amount of incident infrared rays.

The infrared detection signal detected by the infrared detector 11 in a state where the optical system is controlled to be in a non-focused state is input to the noise data update processing unit 44 through the switch 41. The noise data update processing unit 44 calculates the amount of the FPN component (its estimation value) on the basis of the infrared detection signal. More specifically, the noise data update processing unit 44 calculates an average value of infrared detection signals of a detector element of interest and a plurality of peripheral detector elements with respect to each detector element to be processed which calculates the amount of the FPN component, and subtracts an average value of FPN data before update from the average value, to thereby calculate a signal component dependent on incident infrared rays included in the infrared detection signal detected in the detector element of interest. The noise data update processing unit 44 calculates the amount of the FPN component by subtracting the calculated signal component from the infrared detection signal detected in the detector element of interest. The noise data update processing unit 44 updates the FPN data stored in the FPN data storage unit 43 with the calculated amount of the FPN component.

Here, updating the FPN data means that the FPN data stored in the FPN data storage unit 43 is rewritten with new data. The update of the FPN data includes not only update of all the detector elements included in the infrared detector 11 at a time, but also partial update performed on some of all the detector elements. For example, when the infrared detector 11 includes 100 detector elements, pieces of FPN data of these 100 detector elements may be updated at a time, and pieces of FPN data of 40 to 70 out of 100 detector elements may be updated per one-time update.

Figure 3:
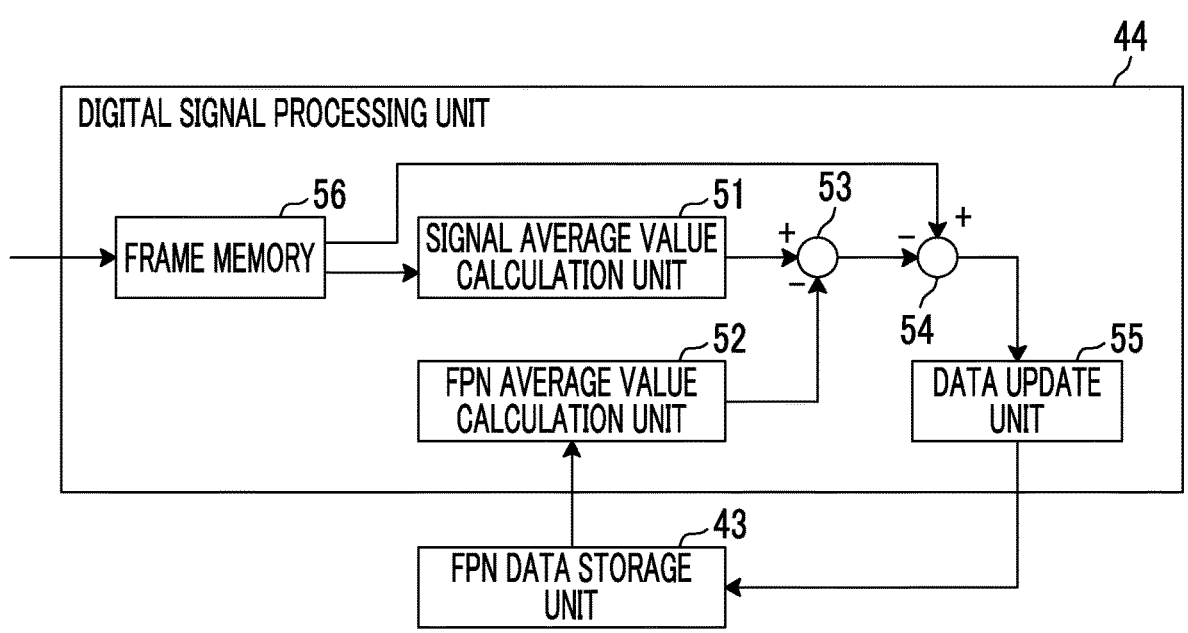
FIG. 3 is a block diagram illustrating a configuration of a noise data update processing unit.

FIG. 3 shows a configuration of the noise data update processing unit 44. The noise data update processing unit 44 includes a signal average value calculation unit 51, an FPN average value calculation unit 52, a subtractor 53, a subtractor 54, a data update unit 55, and a frame memory 56. An infrared image captured by the infrared detector 11 is stored in the frame memory 56. The frame memory 56 may be a portion of the noise data update processing unit 44, and may be provided outside the noise data update processing unit 44.

The signal average value calculation unit 51 refers to the frame memory 56 to calculate an average value of infrared detection signals of a detector element of interest and a plurality of peripheral detector elements. More specifically, the signal average value calculation unit 51 adds infrared detection signals of the detector element of interest and a plurality of detector elements present in the periphery thereof, and calculates a value obtained by dividing the added value by the number of detector elements as an average value.

Here, the peripheral detector elements indicate detector elements, located around a detector element of interest, which have a constant positional relationship with the detector element of interest. The peripheral detector elements indicate, for example, detector elements which are present in a pixel range of 3×3, 5×5, or 7×7 centering on a pixel (detector element) of interest. The range of the peripheral detector element is defined as a pixel range of, for example, 30×30 at its maximum. A percentage of the total number of detector elements included in the infrared detector 11, for example, 1% of the total number may be defined as a peripheral range.

FIG. 4 shows an example of a range of the peripheral detector elements. In this example, a pixel range of 5×5 centering on a pixel of interest is a range of the peripheral detector elements. When the coordinates of a detector element of interest is set to (x, y), the signal average value calculation unit 51 adds infrared detection signals of detector elements included in a coordinate range of (x−2, y−2) to (x+2, y+2). The signal average value calculation unit 51 calculates an average value of infrared detection signals with respect to each position, while performing raster scanning on, for example, the position of the detector element of interest. Meanwhile, on the end of an image, the pixel range protrudes from the image, and thus the range of the peripheral detector elements may be narrower than the pixel range.

The average value calculated by the signal average value calculation unit 51 may be a weighted average value. That is, the average value may be a value obtained by weighting and adding detection signals of the detector element of interest and detector elements present in the periphery thereof, and dividing the added value by a total value of weighting. It is preferable that weighting multiplied to each detector element in weighting addition is set in accordance with a distance between the detector element of interest and each of the peripheral detector elements. For example, it is preferable that the weighting is set to be large as the distance between each of the peripheral detector elements and the detector element of interest becomes shorter, and is set to be small as the distance becomes longer.

FIG. 5 shows an example of weighting which is used in a case where a weighted average value is calculated. A range for obtaining an average value is set to a pixel range of 5×5 similarly to FIG. 4. The weighting of a detector element of interest is set to a largest value, for example, "3". For example, weighting "2" is set in detector elements located at positions shifted by one in the longitudinal direction and/or traverse direction of an image from the detector element of interest. Minimum weighting, for example, weighting "1" is set in detector elements located at positions shifted by two in the longitudinal direction and/or traverse direction of the image from the detector element of interest. Such weighting is used, and thus it is possible to increase the influence of infrared detection signals detected in detector elements close to the detector element of interest on the average value. The setting of weighting shown in FIG. 5 is an example, and the weighting can be arbitrarily set.

Referring back to FIG. 3, the FPN average value calculation unit 52 calculates the average value of FPN data stored in the FPN data storage unit 43. The FPN average value calculation unit 52 adds FPN data of detector elements included in the same range as the pixel range in which the signal average value calculation unit 51 calculates the average value. For example, as shown in FIG. 4, when the signal average value calculation unit 51 adds infrared detection signals of detector elements included in the range of (x−2, y−2) to (x+2, y+2) with respect to the detector element of interest (x, y), the FPN average value calculation unit 52 adds FPN data in the same range. The FPN average value calculation unit 52 calculates a value obtained by dividing the added value of FPN data by the number of detector elements added, as the average value of FPN data. In a case where the weighted average value of infrared detection signals is calculated, the weighted average value may be calculate using the same weighting with respect to the FPN data.

Figure 6:
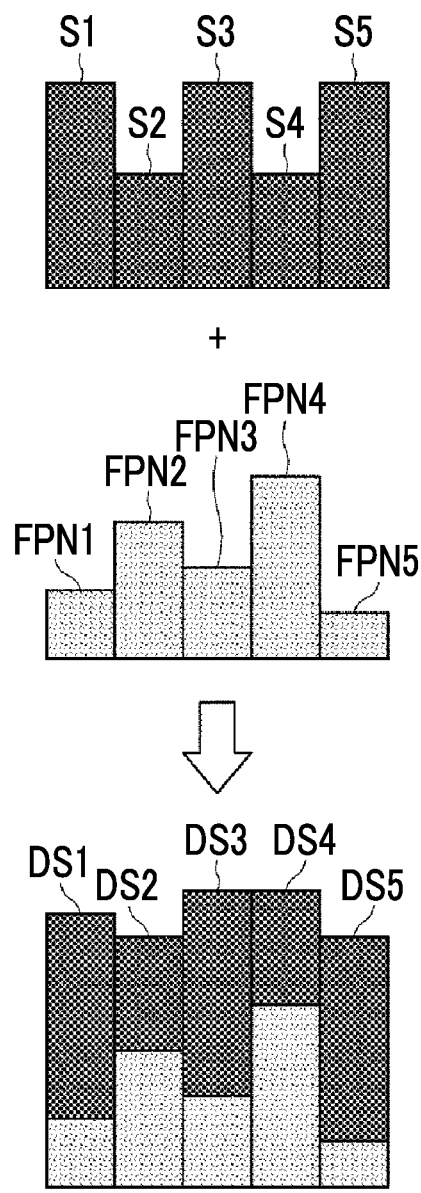
FIG. 6 is a diagram illustrating signal components dependent on incident infrared rays, fixed pattern noise components, and infrared detection signals.

Here, a description will be given of a relationship between infrared detection signals detected by the detector elements of the infrared detector 11, and fixed pattern noise components and signal components dependent on incident infrared rays included in the infrared detection signals. FIG. 6 is a diagram illustrating signal components dependent on incident infrared rays, fixed pattern noise components, and infrared detection signals. FIG. 6 shows signal components dependent on incident infrared rays, fixed pattern noise components, and infrared detection signals with respect to five detector elements of detector elements 1 to 5.

During the normal imaging mode, the optical system 10 (see FIG. 1) is controlled to be in a focused state, and the amounts of infrared rays incident on the detector elements are different from each other depending on the image of a subject. Therefore, as shown in FIG. 6, signal components S1 to S5 dependent on infrared rays incident on each detector element are not often equal to each other. On the other hand, fixed pattern noise components FPN1 to FPN5 of each detector element are specific to the detector elements, and are not dependent on the amounts of the signal components. Infrared detection signals DS1 to DS5 of each detector element have the fixed pattern noise components FPN1 to FPN5 added to the signal components S1 to S5, respectively. The signal components S1 to S5 are detected together with the fixed pattern noise components FPN1 to FPN5, and thus it is not possible to discriminate which portions of the infrared detection signals DS1 to DS5 are the signal components S1 to S5, and which portions of the infrared detection signals are the fixed pattern noise components FPN1 to FPN5.

Figure 7:
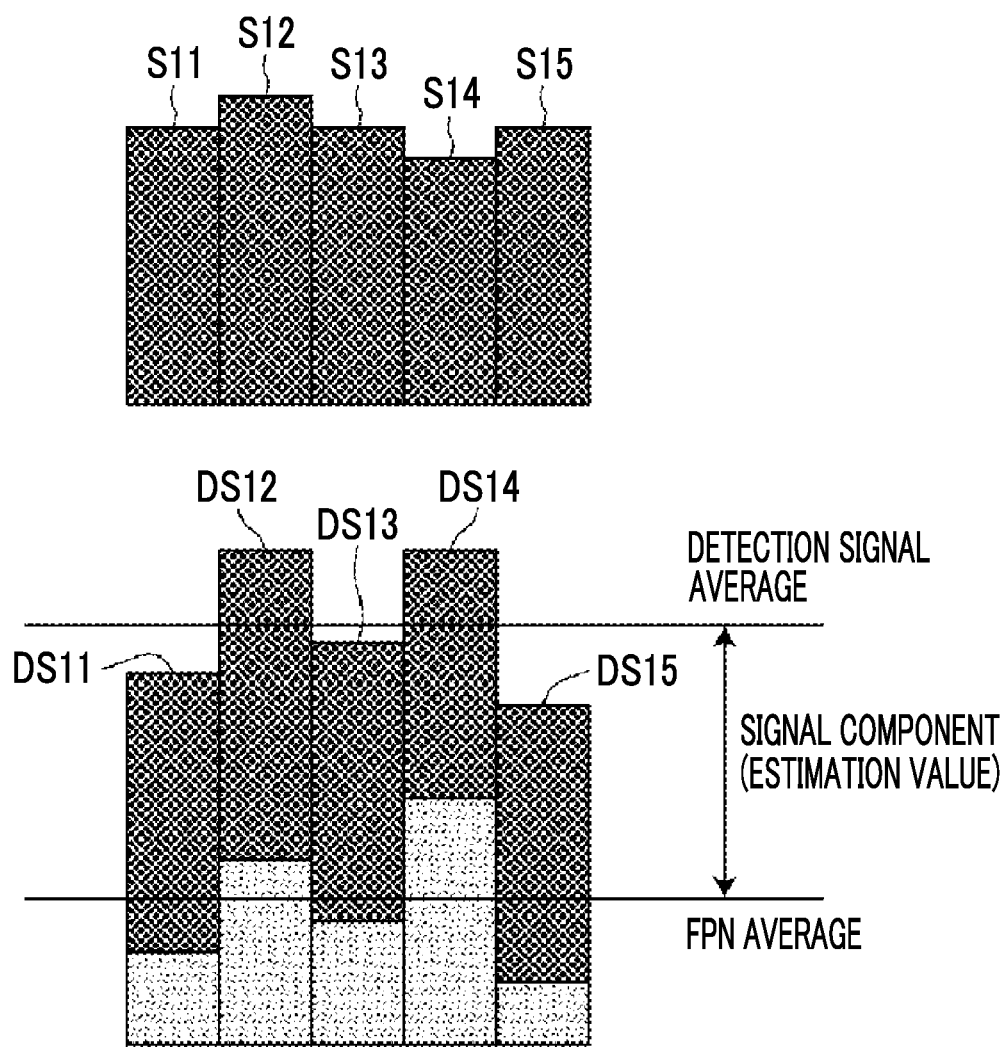
FIG. 7 is a diagram illustrating infrared detection signals and signal components dependent on the incident infrared rays.

FIG. 7 shows infrared detection signals detected in a state where the optical system 10 is controlled to be in a non-focused state, and signal components dependent on incident infrared rays included in the infrared detection signals. In a case where the optical system 10 is set to be in a non-focused state, the image of a subject is formed at a position shifted from the detection surface of the infrared detector 11, and the subject is not resolved. For this reason, an infrared image captured by the infrared detector 11 becomes a blurred image, a difference between the amount of infrared rays incident on a detector element located at a certain position and the amount of infrared rays incident on its peripheral detector element becomes smaller than in a case where the optical system 10 is set to be in a focused state. Therefore, as shown in FIG. 7, it can be expected that signal components S11 to S15 dependent on incident infrared rays have substantially the same value. When a central detector element 3 is set to a detector element of interest, it is considered that the average value of the signal components S11 to S15 becomes substantially equal to that of signal components of the detector element 3.

In a case where it is assumed that FPN of each detector element does not change greatly before and after update, the average value of the signal components S11 to S15 can be calculated in the following procedure. First, the average value of infrared detection signals DS11 to DS15 of each detector element is calculated. As shown in FIG. 7, the infrared detection signals DS11 to DS15 include the fixed pattern noise components FPN1 to FPN5 (see FIG. 6). Next, the average value of the fixed pattern noise components FPN1 to FPN5 is calculated. The average value of the signal components S11 to S15 can be calculated by subtracting the average value of the fixed pattern noise components FPN1 to FPN5 from the average value of the infrared detection signals DS11 to DS15. This average value can be estimated to be equal to the signal component of the detector element of interest (for example, central detector element 3). The amount of the fixed pattern noise component of the detector element of interest can be calculated by subtracting the average value of signal components from the detection signal of the detector element. The amount of the fixed pattern noise component calculated in this manner can be set to update data of FPN data.

Referring back to FIG. 3, the subtractor 53 subtracts the average value calculated by the FPN average value calculation unit 52 from the average value calculated by the signal average value calculation unit 51. The output of the subtractor 53 is equivalent to the signal component of the detector element of interest. The subtractor 54 acquires an infrared signal (value) of the detector element of interest from the frame memory 56, and subtracts the output of the subtractor 53 from the infrared detection signal. The output of the subtractor 54 is equivalent to the amount of the FPN component of the detector element of interest. The data update unit 55 updates the FPN data of the detector element of interest stored in the FPN data storage unit 43 to the amount of the FPN component of the detector element of interest which is output by the subtractor 54.

Figure 8:
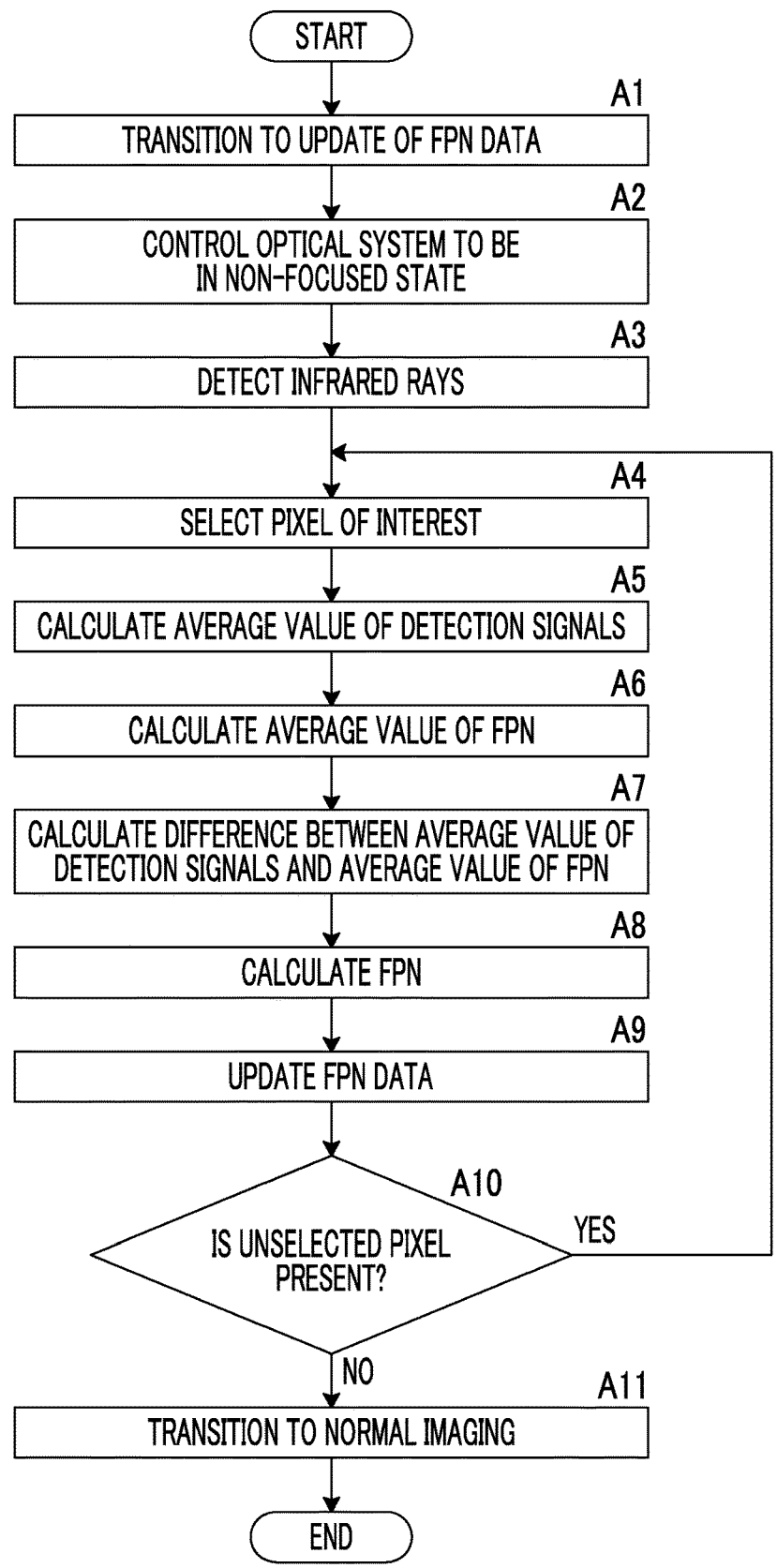
FIG. 8 is a flow diagram illustrating a procedure of a method of updating fixed pattern noise data according to the first embodiment of the present invention.

Hereinafter, an operation procedure will be described. FIG. 8 shows a procedure of a method of updating fixed pattern noise data according to the first embodiment of the present invention. At first, the infrared imaging device 100 operates in the normal imaging mode. The infrared detection signal detected by the infrared detector 11 is input to the digital signal processing unit 14 through the analog signal processing unit 12 (see FIG. 1) and the AD convertor 13. The digital signal processing unit 14 performs an FPN correction process of removing FPN from the infrared detection signal. The infrared detection signal having the FPN removed therefrom is output from the output unit 15.

The control unit 19 switches the operating mode from the normal imaging mode to the update mode of FPN data (step A1). The control unit 19 switches the operating mode to the update mode of FPN data, for example, after a difference between temperature measured by the temperature sensor 18 and temperature during the previous update of FPN data is set to be equal to or larger than a temperature threshold value. Alternatively, the control unit 19 switches the operating mode to the update mode of FPN data in a case where a time equal to or later than a reference time has elapsed from the previous update time of FPN data. The operating mode is switched to the update mode of FPN data, and thus signal processing in the digital signal processing unit 14 is switched from an FPN correction process to an update process of FPN data.

The control unit 19 controls the optical system 10 to be in a non-focused state through the focus adjustment mechanism 16 (step A2). In step A2, the control unit 19 controls the position of the optical system 10 to a position at which the imaging surface of the optical system 10 is not coincident with the detection surface of the infrared detector 11, based on a position signal transmitted to the focus adjustment mechanism 16. The control unit 19 transmits a position signal indicating a position at which the optical system 10 is set to be in a focused state, for example, when a subject is closest to the optical system 10, to the focus adjustment mechanism 16. Alternatively, a position signal indicating a position at which the optical system 10 is set to be in a focused state when a subject is present in infinity is transmitted to the focus adjustment mechanism 16.

Meanwhile, the control unit 19 may determine a position signal transmitted to the focus adjustment mechanism 16, in accordance with a positional relationship between the position of the optical system 10 detected by the position sensor 17 when the operating mode is switched to the update mode of FPN data in step A1, and the position at which the optical system 10 is set to be in a focused state when a subject is closest to the optical system 10 and the position at which the optical system 10 is set to be in a focused state when a subject is present in infinity. The control unit 19, for example, sets the position of the optical system 10 detected by the position sensor 17 to Px, sets the position of the optical system 10, set to be in a focused state in a case where a subject is closest to the optical system 10, to P1, and sets the position of the optical system 10, set to be in a focused state in a case where a subject is present in infinity, to P2, to thereby calculate |Px−P1| and |Px−P2|. In a case of |Px−P1|>|Px−P2|, the control unit 19 outputs a position signal indicating that the position of the optical system 10 is set to P1 to the focus adjustment mechanism 16. In a case of |Px−P1|<|Px−P2|, the control unit 19 outputs a position signal indicating that the position of the optical system 10 is set to P2 to the focus adjustment mechanism 16. In this manner, it is possible to further increase a shift between the imaging position of the optical system 10 and the position of the detection surface of the infrared detector 11, and to increase a blur of the infrared image.

The infrared detector 11 detects infrared rays in a state where the optical system 10 is controlled to be in a non-focused state (step A3). The infrared detection signal which is output by the infrared detector 11 is input to the digital signal processing unit 14 through the analog signal processing unit 12 and the AD convertor 13. The noise data update processing unit 44 (see FIG. 2) of the digital signal processing unit 14 inputs the infrared detection signal through the switch 41. The infrared detection signal detected by each detector element of the infrared detector 11 is stored in the frame memory 56 (see FIG. 3).

The signal average value calculation unit 51 selects the detector element of interest (pixel of interest) from the detector elements included in the infrared detector 11 (step A4). The signal average value calculation unit 51 refers to the frame memory 56 to calculate the average value of the infrared detection signals detected by the peripheral detector elements including the detector element of interest (step A5). The FPN average value calculation unit 52 refers to the FPN data storage unit 43 to calculate the average value of FPN data of the peripheral detector elements including the detector element of interest (step A6). The subtractor 53 calculates a difference between the average value of the infrared detection signals calculated in step A5 and the average value of FPN data calculated in step A6 (step A7). As described above, this difference corresponds to the signal component of the detector element of interest.

The subtractor 54 inputs the infrared detection signal of the detector element of interest from the frame memory 56, and subtracts the difference (signal component of the detector element of interest) calculated in step A7 from the infrared detection signal, to thereby calculate the amount of the FPN component of the detector element of interest (step A8). The data update unit 55 rewrites the FPN data of the detector element of interest stored in the FPN data storage unit 43 with the amount of the FPN component of the detector element of interest which is output by the subtractor 54 (step A9).

The noise data update processing unit 44 determines whether a detector element which is not selected as the detector element of interest is present (step A10). In a case where an unselected detector element is present, the process returns to step A4, and the next detector element is selected. The noise data update processing unit 44 repeatedly performs the processes of step A4 to step A9 until the unselected detector element is not present, for example, while performing raster scanning the position of the detector element of interest. Thereby, the FPN data of each detector element included in the infrared detector 11 is updated.

In a case where it is determined in step A10 that the unselected detector element is not present, the control unit 19 switches the operating mode from the update mode of FPN data to the normal imaging mode (step A11). The control unit 19 controls the optical system 10 to be in a focused state through the focus adjustment mechanism 16. The operating mode is switched to the normal imaging mode, and thus signal processing in the digital signal processing unit 14 is switched from an update process of FPN data to an FPN correction process. The digital signal processing unit 14 performs the FPN correction process using the FPN data updated in step A9.

In the present embodiment, in the update mode of FPN data, the optical system 10 is controlled to be in a non-focused state. The optical system is controlled to be in a non-focused state, and thus infrared rays incident on each detection element of the infrared detector 11 can be made substantially uniformly at least locally. In the present embodiment, the average value of the infrared detection signals detected in a non-focused state is calculated in a range of each detector element and a plurality of peripheral detector elements with respect to each detector element, and the average value of FPN data before update is subtracted from the average value, to thereby calculate a signal component dependent on incident infrared rays included in the detection signal of each detector element. The amount of the FPN component (its estimation value) can be calculated by subtracting the signal component calculated from the detection signal of each detector element. In this manner, it is possible to calculate the amount of the FPN component even in a case where the infrared rays incident on each detector element are not made uniform in the entire image, and to update the FPN data with the calculated amount of the FPN component. In addition, in the present embodiment, it is not necessary to provide a separate shutter mechanism in order to acquire the FPN data.

Figure 9:
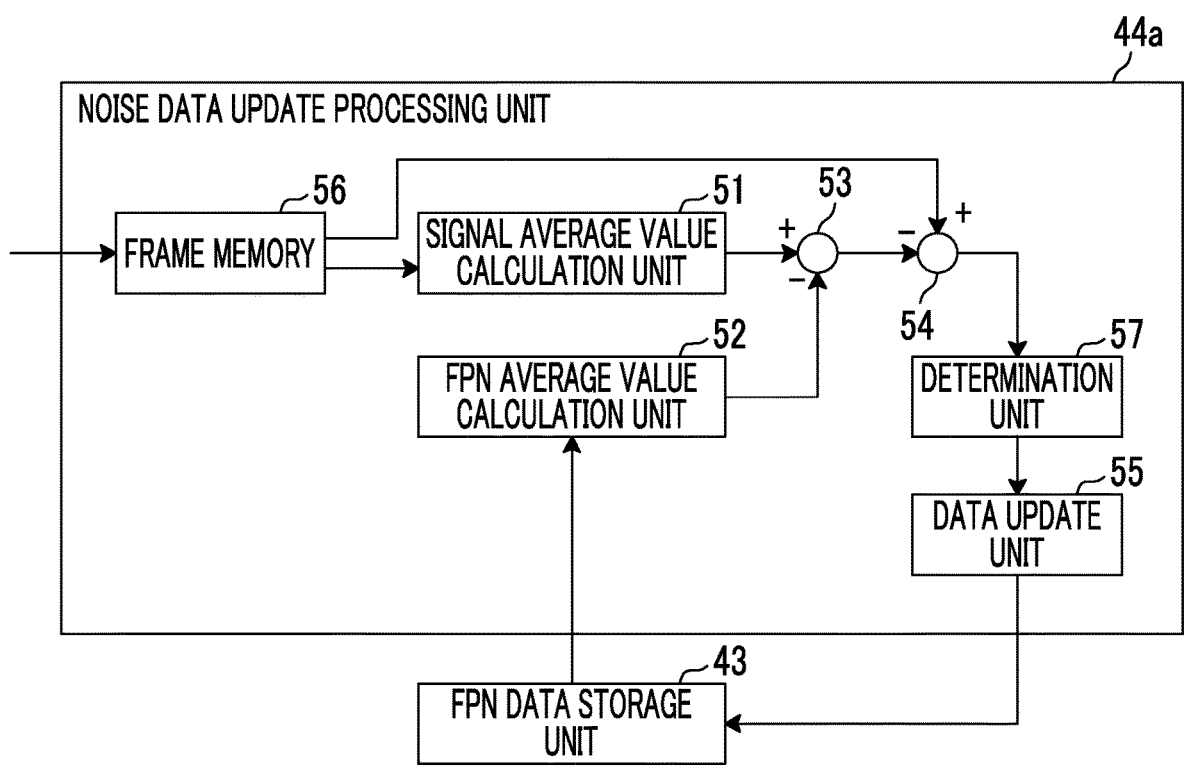
FIG. 9 is a block diagram illustrating a configuration of a noise data update processing unit in an infrared imaging device according to a second embodiment of the present invention.

Subsequently, a second embodiment of the present invention will be described. FIG. 9 shows a configuration of a noise data update processing unit in an infrared imaging device according to the second embodiment of the present invention. The configuration of the infrared imaging device is the same as that of the infrared imaging device 100 according to the first embodiment shown in FIG. 1, and the configuration of a digital signal processing unit is the same as the configuration of the digital signal processing unit 14 used in the first embodiment shown in FIG. 2. In the present embodiment, a noise data update processing unit 44a included in the digital signal processing unit includes a determination unit 57 in addition to the configuration of the noise data update processing unit 44 used in the first embodiment shown in FIG. 3. The other points may be the same as those in the first embodiment.

The determination unit 57 compares the amount of the FPN component which is output by the subtractor 54 with the FPN data stored in the FPN data storage unit 43, with respect to each detector element. The determination unit 57 calculates a difference between the amount of the FPN component which is output by the subtractor 54 and the FPN data stored in the FPN data storage unit 43, and determines whether the difference (the absolute value) is equal to or less than a threshold value (first threshold value). The first threshold value is set to, for example, 20% of the value of the FPN data stored in the FPN data storage unit 43. The first threshold value may not be a fixed value, and the first threshold value may be changed in accordance with a change in temperature from the previous update of FPN data to this update of FPN data. For example, as a change in temperature increases, the first threshold value may be increased. In a case where it is determined that the difference is equal to or less than the threshold value, the determination unit 57 updates the FPN data stored in the FPN data storage unit 43 with the amount of the FPN component which is output by the subtractor 54, through the data update unit 55. In a case where it is determined that the difference is larger than the threshold value, the FPN data is not updated with respect to the detector element. In that case, the FPN data stored in the FPN data storage unit 43 is continuously used.

Figure 10:
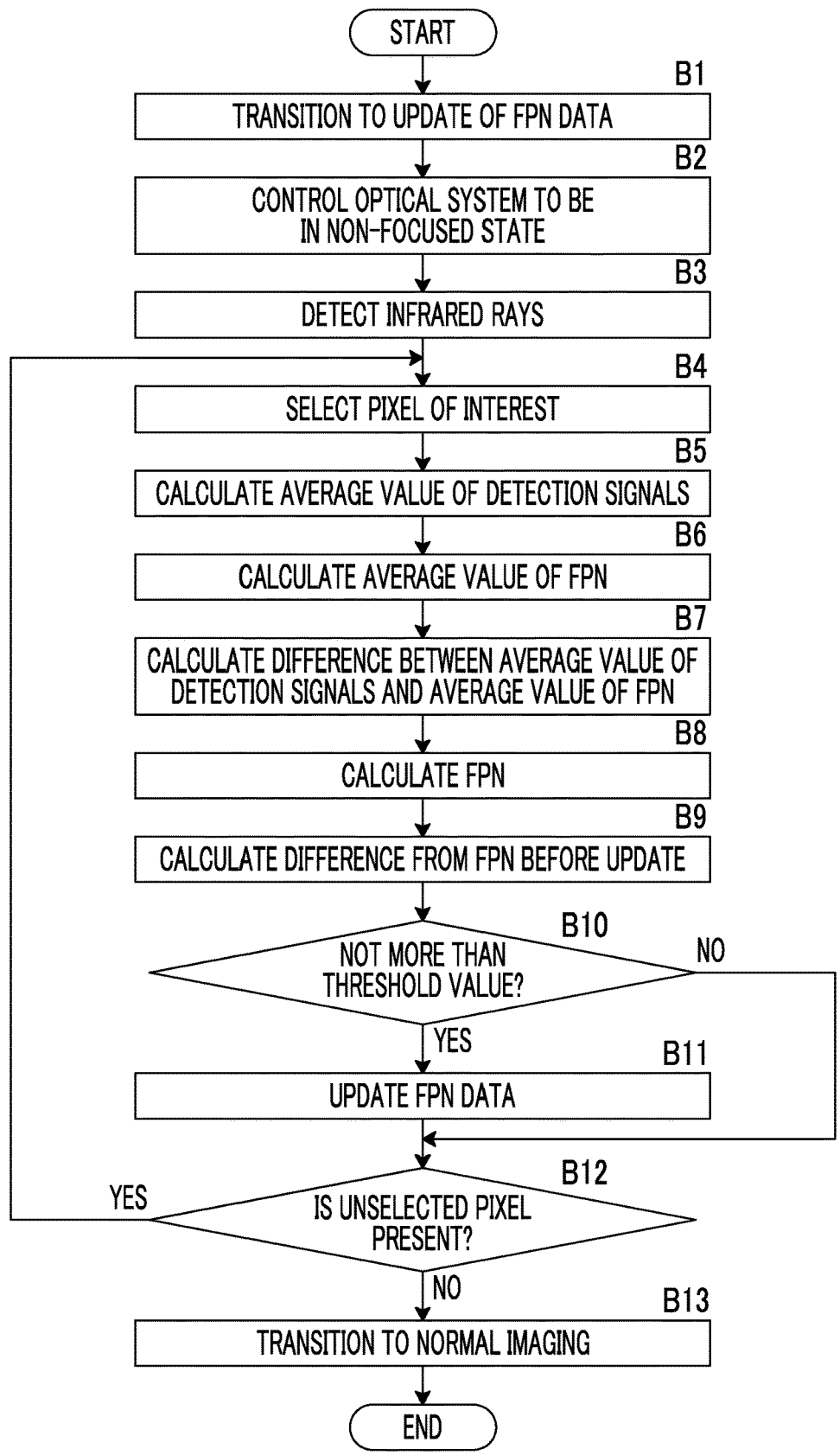
FIG. 10 is a flow diagram illustrating a procedure of a method of updating fixed pattern noise data according to the second embodiment of the present invention.

Hereinafter, an operation procedure in the second embodiment will be described. FIG. 10 shows a procedure of a method of updating fixed pattern noise data according to the second embodiment of the present invention. Meanwhile, steps B1 to B8 are the same as steps A1 to A8 in FIG. 8, and thus the description thereof will not be given.

The determination unit 57 calculates a difference between the amount of the FPN component of the detector element of interest calculated in step B8 and the FPN data of the detector element stored in the FPN data storage unit 43 (step B9). The determination unit 57 determines whether the difference calculated in step B9 is not more than the threshold value (step B10). In a case where it is determined in step B10 that the difference is not more than the threshold value, the data update unit 55 rewrites the FPN data of the detector element of interest stored in the FPN data storage unit 43 with the amount of the FPN component of the detector element of interest which is output by the subtractor 54 (step B11). When it is determined in step B10 that the difference is larger than the threshold value, step B11 is skipped, and the FPN data of the present detector element of interest is not updated.

The noise data update processing unit 44 determines whether a detector element which is not selected as the detector element of interest is present (step B12). This step is the same as step A10 in FIG. 8. In a case where an unselected detector element is present, the process returns to step B4, and the next detector element is selected. In a case where it is determined in step B12 that the unselected detector element is not present, the control unit 19 switches the operating mode from the update mode of FPN data to the normal imaging mode (step B13). This step is the same as step A11 in FIG. 8. The control unit 19 controls the optical system 10 to be in a focused state through the focus adjustment mechanism 16. The operating mode is switched to the normal imaging mode, and thus signal processing in the digital signal processing unit 14 is switched from an update process of FPN data to an FPN correction process. The digital signal processing unit 14 performs the FPN correction process using the FPN data updated at least partially.

In the update process mode of FPN data, since the optical system 10 is controlled to be in a non-focused state, it is considered that infrared rays incident on a certain detector element are substantially the same as infrared rays incident on its peripheral detector elements. However, even in a case where the optical system 10 is controlled to be in a non-focused state, a pattern of a subject may appear in an infrared image. In addition, there it is the possibility of a region in which a subject is resolved being present in a portion of the image. Further, it is also considered that while the update process of FPN data is performed, some kind of subject traverses a screen, and infrared rays incident on the peripheral detector elements are not made uniform. In such a case, a great difference occurs in infrared rays incident on a certain detector element and infrared rays incident on its peripheral detector elements, and thus an error of the amount of the FPN component calculated in the noise data update processing unit 44a may become larger.

In the present embodiment, on the assumption that the amount of the FPN component does not fluctuate greatly before and after update, in a case where a difference between the amount of the FPN component calculated in the noise data update processing unit 44a and the FPN data before update stored in the FPN data storage unit 43 is large, the reliability of the calculated amount of the FPN component is assumed to be low, and the FPN data is not updated. In this manner, the FPN data stored in the FPN data storage unit 43 can be continuously used without using the amount of the FPN component having a large error with respect to a portion in which the pattern of a subject appears, a portion in which a subject is altered, and/or a portion in which some kind of subject is traversed.

In the above, the presence or absence of the update of FPN data is determined for each detector, but this determination may be performed for each region. More specifically, the noise data update processing unit 44a may not perform the update of FPN data in a region including many detector elements in which a difference between the calculated amount of the FPN component and the FPN data stored in the FPN data storage unit 43 is larger than the threshold value.

For example, the determination unit 57 of the noise data update processing unit 44a counts the number of detector elements in which the difference between the calculated amount of the FPN component and the FPN data stored in the FPN data storage unit 43 in a certain region is larger than the threshold value, and divides the number by the total number of detector elements included in the region, to thereby calculate a percentage of detector elements in which a difference in the region is larger than the threshold value. The determination unit 57 may perform a threshold value process on the calculated percentage, and determine that the update of FPN data is not performed on the detector elements included in the region when the percentage is higher than a threshold value (second threshold value). The second threshold value is set to, for example, 50% of the entire region.

FIG. 11 shows a division example of a region of an image. In this example, the entirety (effective pixel region) of an infrared image is divided into four parts in a longitudinal direction and a traverse direction, and a total of sixteen regions of regions R1 to R16 are set within the image. The determination unit 57 calculates a percentage of detector elements in which the difference is larger than the threshold value, in the regions R1 to R16, and determines whether the calculated percentage is high. For example, in a case where the percentage is larger than the threshold value in the regions R11, R12, R15, and R16, the data update unit 55 does not perform the update of FPN data with respect to detector elements included in the regions R11, R12, R15, and R16, and updates the FPN data with the calculated amount of the FPN component with respect to detector elements included in other regions, that is, the regions R1 to R10, R13, and R14. In this manner, the FPN data can be prevented from being collectively updated in a region including many detector elements having a large error of the calculated amount of the FPN component.

Meanwhile, a region is not required to be set in advance. For example, when a detector element in which the difference is larger than the threshold value is present, a region including the detector element may be dynamically set, and it may be determined whether a percentage of detector elements in which the difference is larger than the threshold value is high within the set region. In addition, when a percentage of detector elements in which the difference is larger than the threshold value is low in a certain region, whether the update of FPN data is performed is arbitrary with respect to the detector elements, included in the region, in which the difference is larger than the threshold value. With respect to such detector elements, the update of FPN data may not performed, and the FPN data may be updated by the calculated amount of the FPN component.

In each of the embodiments, the amount of one FPN component is calculated from a one-time infrared detection signal based on the infrared detector 11, and the FPN data is updated using the amount of the FPN component, but there is no limitation thereto. The noise data update processing unit 44 may calculate the amount of the FPN component with respect to each of multiple times of infrared detection signals, calculate the average value of the calculated amounts of the FPN component, and update the FPN data based on the average value of the amounts of the FPN component. In the second embodiment, after a case where it is determined that the difference is equal to or larger than the threshold value is excluded, the average value of the calculated amounts of the FPN component may be calculated from multiple times of infrared detection signals, and the FPN data may be updated with the average value.

In FIG. 4, the shape of a range of the peripheral detector elements is set to a square shape with respect to the detector element of interest, but the shape of a range of the peripheral detector elements is not particularly limited, and may be a rectangular shape, a circular shape, or other shapes. The range of the peripheral detector elements may be a range in which a detector element having a constant positional relationship with the detector element of interest is present. For example, a range in which a detector element having a distance (Euclidean distance) between each of the peripheral detector elements and the detector element of interest within a distance threshold value is present may be defined as the range of the peripheral detector elements.

Hereinbefore, the present invention has been described on the basis of the preferred embodiments, but the infrared imaging device of the present invention and the method of updating fixed pattern noise data are not limited only to the above embodiments, and configurations corrected and changed variously from the configurations of the above embodiments are also included in the scope of the present invention.

Explanation of References

What is claimed is:

1. An infrared imaging device comprising:
    an optical system which is capable of controlling an imaging position;
    an infrared detector, including a plurality of detector elements that detect incident infrared rays, in which infrared rays are incident on an infrared detection surface through the optical system;
    a noise correction processing unit that subtracts fixed pattern noise data from a detection signal of the infrared rays detected by the plurality of detector elements, to thereby remove fixed pattern noise from the infrared detection signal;
    a focus control unit that controls the imaging position of the optical system; and
    a noise data update processing unit that calculates an amount of a fixed pattern noise component on the basis of the detection signal of the infrared rays detected by the plurality of detector elements in a state where the optical system is set to be in a non-focused state by the focus control unit controlling the imaging position of the optical system, and updates the fixed pattern noise data with the calculated amount of a fixed pattern noise component,
    wherein the noise data update processing unit calculates, for each detector element which is a target detector element for calculating the amount of a fixed pattern noise component, an average value of detection signals of the target detector element and a plurality of peripheral detector elements, calculates a signal component dependent on incident infrared rays included in the detection signal of the target detector element by subtracting an average value of fixed pattern noise data before update from the average value of detection signals, and calculates the amount of a fixed pattern noise component by subtracting the calculated signal component from the detection signal of the target detector element.

2. The infrared imaging device according to claim 1, wherein the noise data update processing unit calculates a difference between the calculated amount of a fixed pattern noise component and the fixed pattern noise data before update with respect to each detector element, and updates the fixed pattern noise data with the calculated amount of a fixed pattern noise component with respect to a detector element in which the difference is equal to or less than a first threshold value.

3. The infrared imaging device according to claim 2, wherein the noise data update processing unit does not update the fixed pattern noise data with respect to a detector element in which the difference is larger than the first threshold value.

4. The infrared imaging device according to claim 2, wherein when a percentage of the number of detector elements in which the difference in a certain region is larger than the first threshold value is higher than a second threshold value, the noise data update processing unit does not update the fixed pattern noise data with respect to detector elements included in the region.

5. The infrared imaging device according to claim 1, wherein the average value of detection signals is a weighted average value obtained by weighting and adding detection signals of a target detector element and detector elements present in a periphery of the target detector element, and calculating a weighted average.

6. The infrared imaging device according to claim 5, wherein weighting multiplied to each detector element in weighting addition is set in accordance with a distance between each detector element and the target detector element.

7. The infrared imaging device according to claim 6, wherein the weighting is set to be large as the distance between each detector element and the target detector element becomes shorter.

8. The infrared imaging device according to claim 1, further comprising a temperature measurement unit that measures an ambient temperature,
    wherein the noise data update processing unit updates the fixed pattern noise data in a case where a difference between an ambient temperature measured by the temperature measurement unit and an ambient temperature during previous update of the fixed pattern noise data is equal to or larger than a temperature difference threshold value.

9. The infrared imaging device according to claim 1, wherein the noise data update processing unit updates the fixed pattern noise data repeatedly.

10. A method of updating fixed pattern noise data indicating fixed pattern noise in an infrared detector including a plurality of detector elements, the method comprising:
    a step of controlling an optical system which is capable of controlling an imaging position, and setting infrared rays incident on the infrared detector to be in a non-focused state;
    a step of calculating an amount of a fixed pattern noise component on the basis of a detection signal of the infrared rays detected by the plurality of detector elements in a state of being controlled to be in the non-focused state; and
    a step of updating the fixed pattern noise data with the calculated amount of a fixed pattern noise component,
    wherein the step of calculating the amount of a fixed pattern noise component includes calculating, for each detector element which is a target detector element for calculation, an average value of detection signals of the target detector element and a plurality of peripheral detector elements, calculating a signal component dependent on incident infrared rays included in the detection signal of the target detector element by subtracting an average value of fixed pattern noise data before update from the average value of detection signals, and calculating the amount of a fixed pattern noise component by subtracting the calculated signal component from the detection signal of the target detector element.

* * * * *